US010003549B2

(12) United States Patent
Kulick

(10) Patent No.: US 10,003,549 B2
(45) Date of Patent: Jun. 19, 2018

(54) SYSTEM FOR ALLOCATING SENSOR NETWORK RESOURCES

(71) Applicant: Google LLC, Mountain View, CA (US)

(72) Inventor: Matthew Kulick, San Francisco, CA (US)

(73) Assignee: Google LLC, Mountain View, CA (US)

( * ) Notice: Subject to any disclaimer, the term of this patent is extended or adjusted under 35 U.S.C. 154(b) by 94 days.

(21) Appl. No.: 15/134,675

(22) Filed: Apr. 21, 2016

(65) Prior Publication Data
US 2017/0310608 A1   Oct. 26, 2017

(51) Int. Cl.
G06F 15/173 (2006.01)
H04L 12/911 (2013.01)
H04L 29/08 (2006.01)
G06Q 30/00 (2012.01)

(52) U.S. Cl.
CPC ............ H04L 47/82 (2013.01); G06Q 30/00 (2013.01); H04L 67/12 (2013.01)

(58) Field of Classification Search
CPC .......... G06Q 30/08; H04L 47/82; H04L 67/12
USPC ........................................................ 709/226
See application file for complete search history.

(56) References Cited

U.S. PATENT DOCUMENTS 8,589,206 B2 * 11/2013 Boss ................ G06Q 10/06315
705/37
9,129,337 B2 * 9/2015 Chassin ................ G06Q 30/08

2003/0225474 A1 * 12/2003 Mata ................ G05B 19/41865
700/121
2010/0042456 A1 * 2/2010 Stinchcombe ......... G06Q 10/06
705/35
2015/0046279 A1 * 2/2015 Wang .................... G06F 9/5027
705/26.3

FOREIGN PATENT DOCUMENTS

WO   2014066429 A1   5/2014

OTHER PUBLICATIONS

Anonymous: "ART: Das bringt die neue Android-Runtime." Android User. May 22, 2014 (May 22, 2014), XP055342888, Retrieved from the Internet: <https://www.android-user.de/art-das-bringt-die-neue-android-runtime/>.
International Search Report and Written Opinion for PCT Application No. PCT/US2016/065289, dated Feb. 15, 2017.

* cited by examiner

Primary Examiner — Kristie Shingles
(74) Attorney, Agent, or Firm — Lerner, David, Littenberg, Krumholz & Mentlik, LLP

(57) ABSTRACT

The technology relates to allocating the resource costs of a sensor network. In particular, an auction model is used to control the demand-side of sensor network utilization. Users bid for fractional sensor network utilization over particular variables such as time, geography, and data type. During the bidding process, the available sensor network resources may be unknown. Therefore, users bid on the predicted fractional sensor network utilization, which can be estimated using historical sensor network trends and models. Throughout this process, device performance is preserved while providing for user experience, privacy, and security.

20 Claims, 10 Drawing Sheets

SYSTEM FOR ALLOCATING SENSOR NETWORK RESOURCES

BACKGROUND

A sensor network includes a plurality of spatially distributed autonomous devices with sensors that can monitor physical or environmental conditions, such as temperature, humidity, sound, radiation, and pressure. The devices pass such data through the network to a centralized location. In some sensor networks, communication with a centralized location is bi-directional, so the behavior of these autonomous devices can be modified.

A sensor network may be comprised of mobile devices. These mobile devices may have numerous types of sensors, such as cellular radios, infrared transceivers, accelerometers, gyroscopes, and barometers, built right into the device. These mobile devices can also communicate with and forward data from other devices, such as beacons, through communication standards.

However, this type of sensor network is a scarce resource because new devices cannot be added to the network arbitrarily, quickly, or in a predictable manner. For example, a network of mobile devices is highly dependent upon when people decide to get a device, when they upgrade or change devices, whether they choose to carry a device around with them, and whether they decide to participate in the sensor network. Therefore, many aspects of control are not centralized. Furthermore, excessive requests from a centralized server for data, such as beacon scan results, from mobile devices within that sensor network may dramatically decrease the battery life of those mobile devices. A dramatic decrease in battery life will likely negatively impact the interactive experience of owners with their mobile devices, and also lead to more owners disabling or choosing not to join the sensor network.

BRIEF SUMMARY

The technology relates to allocating the resource costs of a sensor network. In one aspect of the disclosure, an auction model is used to control the demand-side of sensor network utilization. Users bid for sensor network utilization over particular variables such as time, geography, and data type. During the bidding process, the available sensor network resources may be unknown. Therefore, one or more servers may subsequently translate or normalize the received user bids using predicted fractional sensor network utilization costs, which can be estimated using historical sensor network trends and models. Throughout this process, device performance may be preserved while providing for the owner's experience, privacy, and security. On both the bidding-side and on the data collection side, affordances will be offered to protect participants in the sensor network. For example, data types collected and bid parameters will be restricted to prevent bidders from being able to focus the data collection to a particular person, device, etc.

One aspect of the disclosure provides a method for allocating resources of a sensor network with a plurality of devices. The method includes receiving bid requests, wherein each bid request identifies at least a type of data to be collected by a plurality of data collection devices; determining whether any of the received bid requests violate any of a set of predefined privacy protection rules; rejecting any bid requests determined to violate the predefined privacy protection rules; computing resource costs associated with remaining bid requests, the resource costs corresponding to an amount of strain on the plurality of data collection devices; selecting one or more of the remaining bid requests based on at least the computed resource costs associated with the bid requests; and sending device rules to at least some of the plurality of data collection devices based on the one or more selected bid requests, wherein the device rules configure at least some of the plurality of data collection devices to collect information responsive to the one or more selected bid requests.

Another aspect of the disclosure provides a system, comprising a memory and one or more servers in communication with both the memory and a sensor network. The one or more servers are configured to receive bid requests, wherein each bid request identifies at least a type of data to be collected by the plurality of data collection devices; determine whether any of the received bid requests violate any of a set of predefined privacy protection rules; reject any bid requests determined to violate the predefined privacy protection rules; compute resource costs associated with remaining bid requests, the resource costs corresponding to an amount of strain on the plurality of data collection devices; select one or more of the remaining bid requests based on at least the computed resource costs associated with the bid requests; and send device rules to at least some of the plurality of data collection devices based on the one or more selected bid requests, wherein the device rules configure at least some of the plurality of data collection devices to collect information responsive to the one or more selected bid requests.

Yet another aspect of the disclosure provides a non-transitory computer-readable medium storing instructions executable by a processor for performing a method for allocating resources of a sensor network with a plurality of devices. The method includes receiving bid requests, wherein each bid request identifies at least a type of data to be collected by a plurality of data collection devices; determining whether any of the received bid requests violate any of a set of predefined privacy protection rules; rejecting any bid requests determined to violate the predefined privacy protection rules; computing resource costs associated with remaining bid requests, the resource costs corresponding to an amount of strain on the plurality of data collection devices; selecting one or more of the remaining bid requests based on at least the computed resource costs associated with the bid requests; and sending device rules to at least some of the plurality of data collection devices based on the one or more selected bid requests, wherein the device rules configure at least some of the plurality of data collection devices to collect information responsive to the one or more selected bid requests.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. For example, while certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
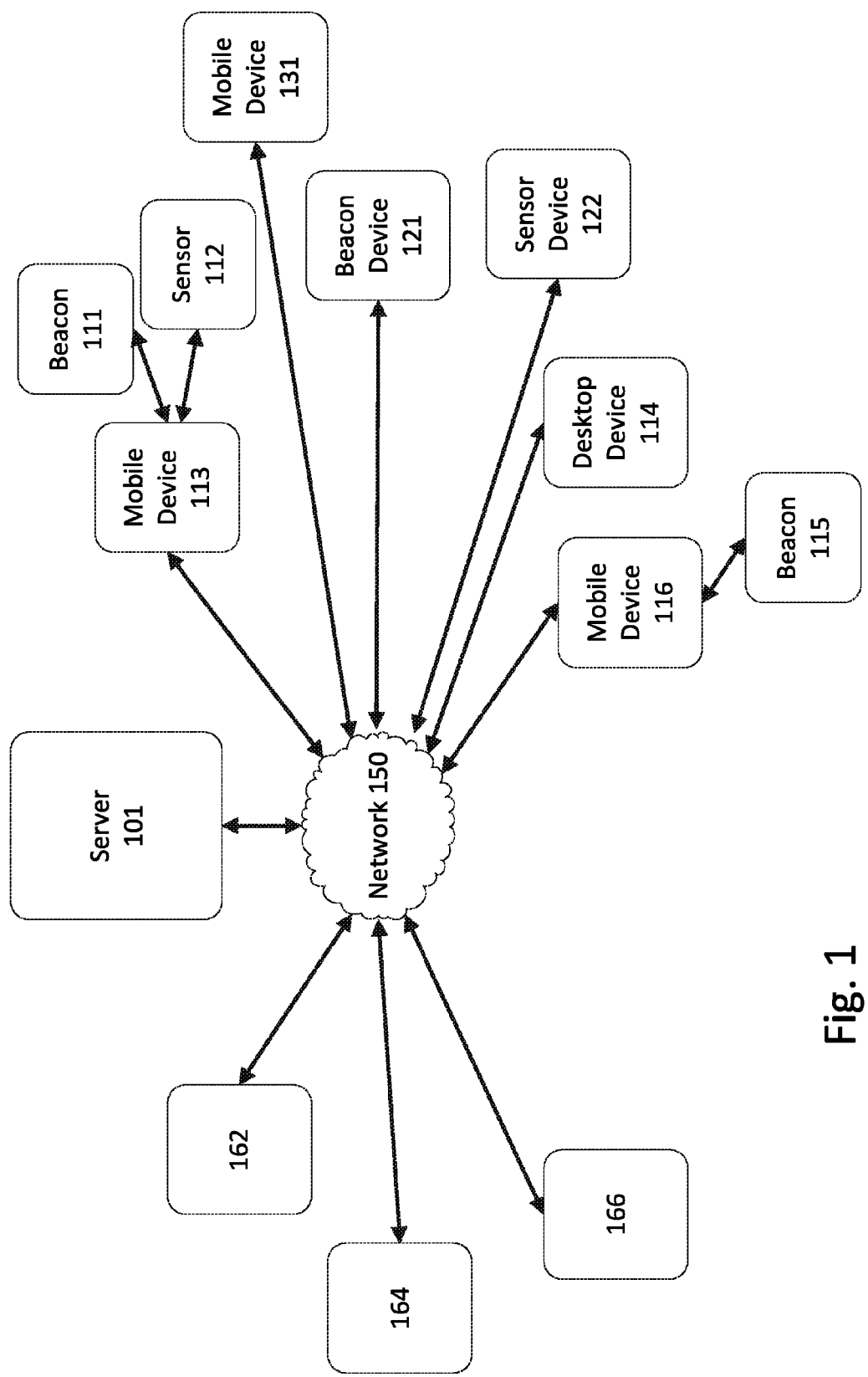
FIG. 1 is a block diagram of a sensor network in accordance with aspects of the disclosure.

FIG. 1 illustrates a system 100 in accordance with aspects of the disclosure. The system 100 includes a plurality of request submission devices 162-166 in communication with server 101 through network 150. The server 101 also communicates with a sensor network of data collection devices 111-116, 121-122, and 131 through the network 150. While FIG. 1 shows the same network being used for communications between the request submission devices 162-166 and the server 101, and also for communications between the server 101 and data collection devices, multiple separate networks may be used.

The data collection devices 111-116, 121-122, and 131 may be capable of collecting any of a variety of types of statistical data, such as data relating to air quality, weather, pressure, etc. As such, there are many use cases that can be enabled with large scale sensor networks, such as detecting earthquakes, forecasting weather, monitoring infrastructure, etc. The data collection devices are limited to devices for which the owner of the device has agreed to collect and provide data, and in some examples the owner may be compensated for their participation. For example, an owner may agree to participate in the sensor network through an OS-level feature or through an app or service on their device. The mechanism through which an owner accomplishes this may also provide the owner with an interface for managing their participation in the sensor network. This management interface may allow an owner to specify exactly which types of data they are willing to provide. For example, an owner may specify that temperature data, but not humidity data may be collected from their device. The management interface may also allow an owner to set device participation parameters, such as maximum data usage, that would define how their device participates in the sensor network. The management interface may also provide an owner with statistics regarding the type and amount of data collected.

The request submission devices 162-166 may be used to submit requests for data from the data collection devices. The requests may vary with respect to the type of data, a number of devices used to collect the data, a geographical region in which the data is to be collected, a duration of time over which the data is to be collected, etc. Accordingly, each request may have a different effect on the collection devices with respect to the resources required to satisfy the request. Each request is subject to privacy protection measures. For example, the request cannot restrict collection to one device or one building. Put another way, a response to the request cannot allow someone to identify with certainty or near-certainty any characteristics or data regarding a particular owner or individual, or a reasonably small group of owners or individuals. Configurable thresholds may be utilized and monitored to ensure that requests from request submission devices do not violate these privacy policies.

In some instances, more requests may be submitted than the resources can handle at a given time. Accordingly, the server 101 converts each request to a cost, the cost being based on, for example, an amount of resources required, an amount of resources available, etc. Request submission devices 162-166 may modify their requests based on the cost. In other examples, some requests may be accepted, while others are rejected. In response to an accepted request, the server 101 configures the data collection devices in the sensor network to collect and report the requested data. For example, the server 101 may push a set of device rules to the data collection devices.

The data collection devices may be any of a variety of types of computing devices. For example, the data collection devices may include mobile phones, laptops, tablets, music players, cameras, gaming systems, or any other devices capable of establishing communication with the server 101. For example, as shown in FIG. 1, beacon 111, sensor 112, mobile device 113, desktop device 114, beacon 115, mobile device 116, beacon device 121, sensor device 122, and mobile device 131 may provide information to the server 101. Mobile devices 113 and 116 may include a mobile phone or a device such as a wireless-enabled PDA, a tablet PC, or a netbook that is capable of obtaining and sending information via the Internet. Mobile devices 113 and 116 may also include a computing system where the owner may input information using a small keyboard, a keypad, microphone, using visual signals with a camera, or a touch screen. Beacon device 121 could be any device fitted with a wireless communication mechanism, such as a speaker, microphone, clock, dispenser, or any other type of machine. Beacon device 121 may be a Bluetooth® low energy (BLE) beacon capable of interacting with nearby Bluetooth®-enabled devices. Sensor device 122 could be any type of specialized sensor device, such as a weather station capable of measuring various outdoor environmental conditions.

In some examples, data collection devices may communicate indirectly with the server 101 through one or more other devices. For example, beacons 111 and 115 and sensor 112 utilize a secure channel to send data to server 101 through one of mobile devices 113 and 116. These devices can utilize standard communications protocols, such as Ethernet, Wi-Fi and HTTP, protocols that are proprietary to one or more companies, and various combinations of the foregoing. These devices can utilize one or more cryptographic methodologies, such as public key encryption, to ensure that information is sent securely. While beacons 111 and 115 may be structured and configured similarly to beacon device 121, in other examples beacons 111 and 115 may be capable of sending one way signals while the beacon device 121 may be capable of two-way transmissions. Similarly, sensor 112 may be similar to sensor device 122 or may be configured for one-way communication. Just as an example, sensor 112 could be a temperature sensor in communication with a mobile cellular device.

Server 101 may be any type of computing device or system of computing devices capable of communicating over a network. The server 101 is further described with respect to FIG. 2.

Request submission devices 162-166 may be any type of computing device capable of communicating with the server 101, either directly or indirectly over a secure channel. Each request submission device 162-166 may have, for example, a user interface, such as an input and display, where request information may be entered and responsive information may be received. In some examples, the requests may contain a maximum price that a particular end-user is willing to pay for collected data. These bid requests may also express an end user's one-time need or recurring need for a specific data type. For example, an end-user may want to collect a specific data type on a daily, bi-weekly, monthly, or yearly basis. The bid request may also specify the quality of the data that a user wants to collect or the number or percentage of devices in a particular geographic area in which the user would like to collect. For example, an end-user may only be interested in data from devices within a particular geographic area, such as a particular region (e.g., the Northeast), state, city, town, or any other geographic area. However, as will be discussed in more detail below, if any of these bid requests raise privacy concerns, they will be automatically rejected. For example, the user bid is subject to both absolute and relative limits on the specificity of the geographical area, regardless of how much the user is willing to pay. Therefore, user bids cannot specify particular buildings for data collection, or even larger geographies, which despite being larger, are unique to a very small number of individuals. Furthermore, in some embodiments, end-users may be required to accept a terms-of-service agreement or something similar to help ensure the privacy and security of the owners of the devices with the sensor network.

Some example bid requests may include: (1) "I would like a report of the data collected from 1,000 mobile devices in Westfield, N.J. over the course of a week regarding the temperature conditions," (2) "I would like a daily report of the data collected from 100,000 mobile devices in the Greater NYC area regarding the humidity measured by those devices," (3) "I would like a one-time report of the data collected from 10,000 mobile devices in the San Francisco bay area regarding the presence of municipal beacons," (4) "I would like a daily report of the data collected from 200 devices in rural NJ regarding air quality," and (5) "I would like a report based on a statistically significant sample (with laxer bounds) of data collected from mobile devices within the entire sensor network regarding the usage of beacons that I own."

In addition to providing owners with the option to add or remove their devices from the sensor network at any time, provisions are made for protecting privacy and security. For example, only generic non-personal data may be collected, and the data provided in response to bid requests may be an aggregation of generalized non-personal information. Collected data is transmitted from the collection devices to the server over secure channels to prevent interception or eavesdropping. Relative and absolute thresholds are established across all collection data types to prevent association of particular data with particular individuals or devices with certainty or statistical near-certainty. Additional provisions include anonymization of personally identifiable information, aggregation of data, filtering of personal information, encryption, hashing or filtering of personal information to remove personal attributes, time limitations on storage of information, or limitations on data use or sharing. In some embodiments, server 101 will enforce a threshold value or minimum amount of device data that can be forwarded to a particular bidder. For example, server 101 will automatically reject bid requests effectively requesting data from 40 or less devices. As a result of these privacy and security measures, some bid requests will be rejected without any regard to the maximum price specified in those bids. In some embodiments, server 101 may ban or exclude certain requesting devices exhibiting abusive behavior. In such embodiments, server 101 may verify the good standing of requesting devices before accepting any bids from those devices. In addition to or instead of these automated privacy and security measures, in some embodiments, some or all of the requests may be reviewed manually.

The data collected may be used by the request submission devices 162-166 to compute a variety of statistics. For example, statistics relating to the usage of municipal beacons within a particular geographic area may provide some insight into the tourist activity of people in that area. In other cases, this kind of information can advance the scientific process. For example, suppose several major power plants in rural NJ just installed a new type of filter in their smokestacks. Information regarding the air quality in rural NJ could provide significant insight into the effectiveness of those filters.

According to one aspect of the disclosure, server 101 may use an auction-based model to control the demand for utilization of the data collection devices. For example, server 101 may implement a second-price auction-based model. As applied in this context, a first user submits a bid request through device 162, and a second user submits a bid request through device 164, both bid requests specifying a maximum price that the users are willing to pay for a particular data type. Server 101 can then sort and rank those bid requests based on, for example, the maximum prices contained in those requests. The user with the winning bid request would pay the greater of the second-highest maximum price submitted or a reserve price, but not more than the maximum price specified by that user. If server 101 determines that the sensor network cannot accommodate all of the requests, the lower ranking bids may be rejected.

Figure 2:
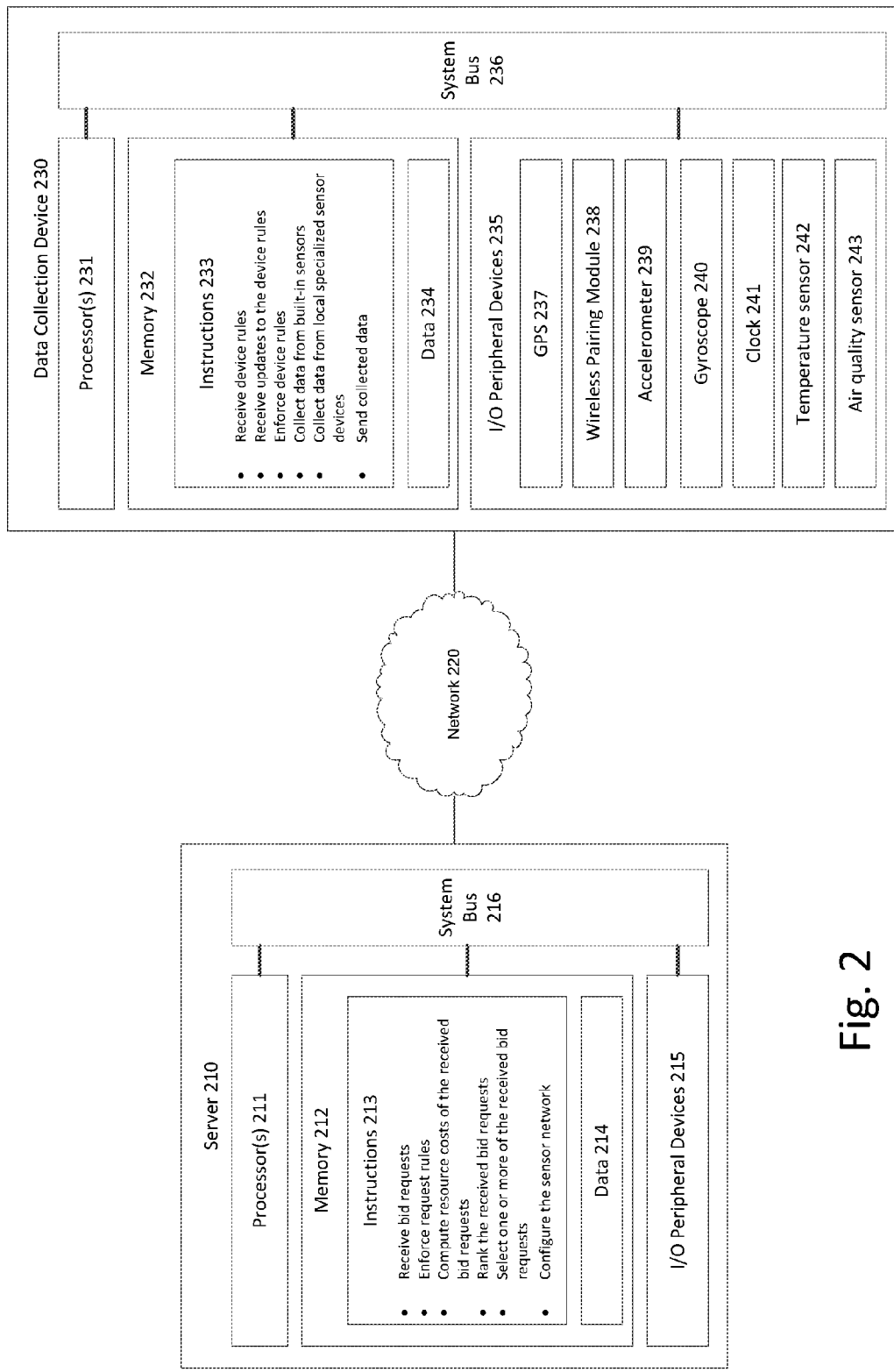
FIG. 2 is a block diagram of an example system in accordance with aspects of the disclosure.

FIG. 2 depicts a block diagram of an example server and an example data collection device that may be part of a sensor network similar. Server 210 is communicatively coupled with data collection device 230 through network 220. Server 210 contains one or more processors 211, memory 212, I/O peripheral devices 215, and other components typically present in general purpose computing devices. Several of these components may be communicatively coupled together through system bus 216.

One or more processors 211 may be any conventional processors, such as a commercially available CPU. Alternatively, the processors can be dedicated components such as an application specific integrated circuit ("ASIC") or other hardware-based processor. Although not necessary, server 210 may include specialized hardware components to perform specific computing processes, such as compressing data, caching data, or performing any other process.

Memory 212 can store information accessible by one or more processors 211, including instructions 213 that can be executed by the one or more processors 211. Memory 212 can also include data 214 that can be retrieved, manipulated or stored by the one or more processors 211. The memory can be of any non-transitory type capable of storing information accessible by the processor, such as a hard-drive, memory card, ROM, RAM, DVD, CD-ROM, write-capable, and read-only memories.

Instructions 213 can be any set of instructions to be executed directly, such as machine code, or indirectly, such as scripts, by the one or more processors. In that regard, the terms "instructions," "applications," "steps" and "programs"

can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 214 can be retrieved, stored or modified by the one or more processors 211 in accordance with instructions 213. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Although FIG. 2 functionally illustrates the processor, memory, and other elements of server 210 as being within the same block, the processor, computer, computing device, or memory can actually comprise multiple processors, computers, computing devices, or memories that may or may not be stored within the same physical housing. For example, the memory can be a hard drive or other storage media located in housings different from that of server 210. Accordingly, references to a processor, computer, computing device, or memory will be understood to include references to a collection of processors, computers, computing devices, or memories that may or may not operate in parallel. For example, server 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

Data collection device 230 may be any type of computing device or system of computing devices capable of communicating over a network. In this embodiment, data collection device 230 contains one or more processors 231, memory 232, I/O peripheral devices 235, and other components typically present in general purpose computing devices. Several of these components may be communicatively coupled together through system bus 236. In many respects, data collection device 230 is like server 210. However, the specific hardware of data collection device 230 is likely to be quite different from hardware of server 210. For example, data collection device 230 may have specialized sensor hardware such as GPS 237, wireless communication module 238 or accelerometer 239, gyroscope 240, clock 241, temperature sensor 242, air quality sensor 243, or any of a variety of other types of sensors, such as light sensors, electromagnetic field (EMF) sensors, heat sensors, etc.

When executed by one or more processors 211, instructions 213 may cause server 210 to receive bid requests from end users that wish to obtain information from the sensor network. These bid requests may contain a maximum price that a particular user is willing to pay for such information. These bid requests may also specify a duration for which the data should be collected. For example, a user may want to collect a specific data type on a daily, bi-weekly, monthly, or yearly basis. The bid request may also specify the quality of the data that a user wants to collect or the number or percentage of devices in a particular geographic area from which the user would like to collect data.

Instructions 213 may further cause server 210 to convert the bid requests to resource costs. These resource costs may be related to, for example, the number of devices required to satisfy a particular request made in a bid, the battery costs of fulfilling that request, and/or the bandwidth costs of fulfilling that request. For example, a bid request for air purity may have a higher resource cost than a bid request for beacon scans because the typical subsystem used for analyzing air purity draws significantly more current from a battery than the typical wireless communication subsystem. Historical data regarding the amount of system resources consumed during identical or similar types of sensing activities may be used as a starting point by server 210 for this conversion process.

Instructions 213 may further cause server 210 to select one or more of the bid requests. In one embodiment, a second-price auction-based model can be used. As applied in this context, users would submit bid requests for utilizing the sensor network. In one embodiment, those bid requests could contain a maximum price that a user is willing to pay for a particular data type. One or more servers could then sort and rank those bid requests based on the maximum prices contained in those requests. The user with the winning bid request would pay the greater of the second-highest maximum price submitted or a reserve price, but never more than the maximum price specified by that user. If the one or more servers determine that the sensor network cannot accommodate all of the requests, the lower ranking bids may be rejected.

Instructions 213 may further cause server 210 to configure the sensor network by sending device rules to at least some of the data collection devices within the sensor network, such as data collection device 230. The process of sending device rules may also include updating device rules already stored on at least some data collection devices within the sensor network. For example, server 210 may send device rules to data collection device 230 that alter instructions 233 stored in memory 232. These device rules can be directed to the frequency in which measurements pertaining to a certain data type are made. For example, a device rule may direct a data collection device to perform a beacon scan once per hour. These device rules can also limit the number of beacons reported per scan or limit the scan window duration. To conserve power, the device rules can direct data collection devices to only take measurements when the owner of that data collection device is interacting with it, as opposed to when the data collection device is in a sleep mode or another similar mode of operation.

Instructions 213 may further cause server 210 to collect the requested data from at least some of the data collection devices within the sensor network and forward that data to the request submission devices associated with the selected bid requests. Additionally, server 210 may use a linear combination of the maximum prices and resource costs of the selected bids along with a minimum threshold to determine the ultimate price charged to the users that sent those bid requests. This price may be sent to these users along with the relevant data.

As discussed above, instructions 233 may cause data collection device 230 to receive and enforce device rules sent by server 210. Instructions 233 may further cause data collection device 230 to collect data from one or more of the I/O peripheral devices 235. Instructions 233 may also cause the data collection device to collect data from nearby devices that are in wireless communication with it. For example, instructions 233 may cause data collection device 230 to collect data from a separate temperature sensor via wireless communication. Instructions 233 may then further cause data collection device 230 to send any collected data to server 210.

Figure 3:
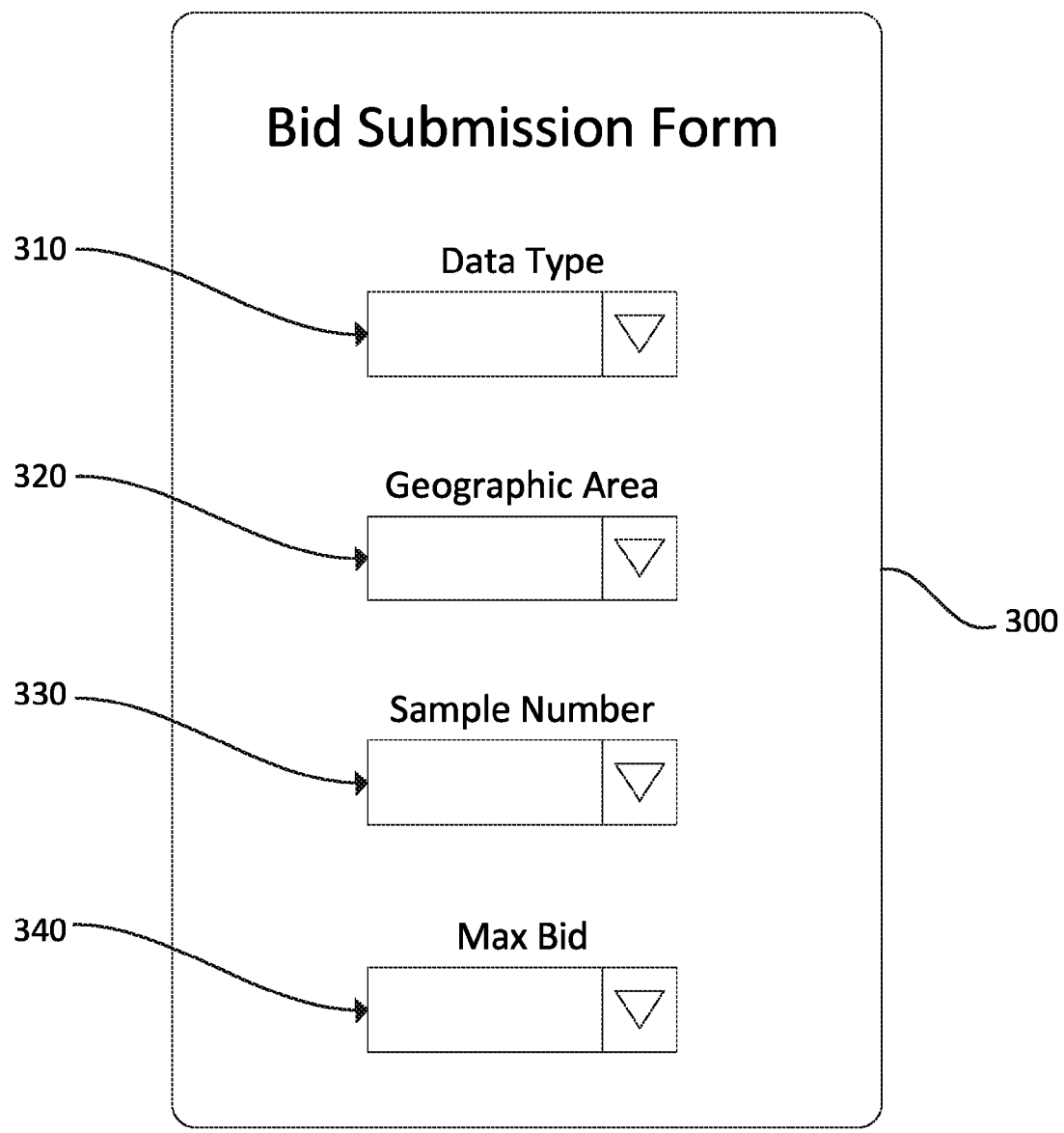
FIG. 3 is an illustration of an example user interface in accordance with aspects of the disclosure.

FIG. 3 is an example of a bid submission interface that may be provided to users. In some examples, the interface may include a standardized form including a number of particular fields. In some embodiments, users may be provided with a software package or a Web-based interface. As shown in FIG. 3, bid submission form 300 contains four drop-down menus: data type 310, geographic area 320, sample number 330, and max bid 340. In data type 310, a user can select a particular type of data that they are interested in. Examples of data types include public beacon scans, air quality, and temperature. In geographic area 320, a user can select a geographic location. Examples of geographic locations include regions (e.g., the Northeast), states, cities, and towns. In sample number 330, a user can select the number of devices that are required to satisfy the bid request. In max bid 340, the user can select the maximum amount that they are willing to pay for such information. This amount can be any measure of pecuniary value such as a dollars, points, or tokens. The device presenting the user with bid submission form 300 can then automatically generate and send a bid request. While only a few fields are shown in this example, more or fewer fields may be included. By way of example only, additional fields may be provided for the user to specify a duration of the requested data collection, whether to increase the max bid in particular situations, a type of device used to collect data, etc. Moreover, the fields need not be drop-down menus, but may be other types of information entry fields, such as free text entry, radio buttons, etc.

Figure 4:
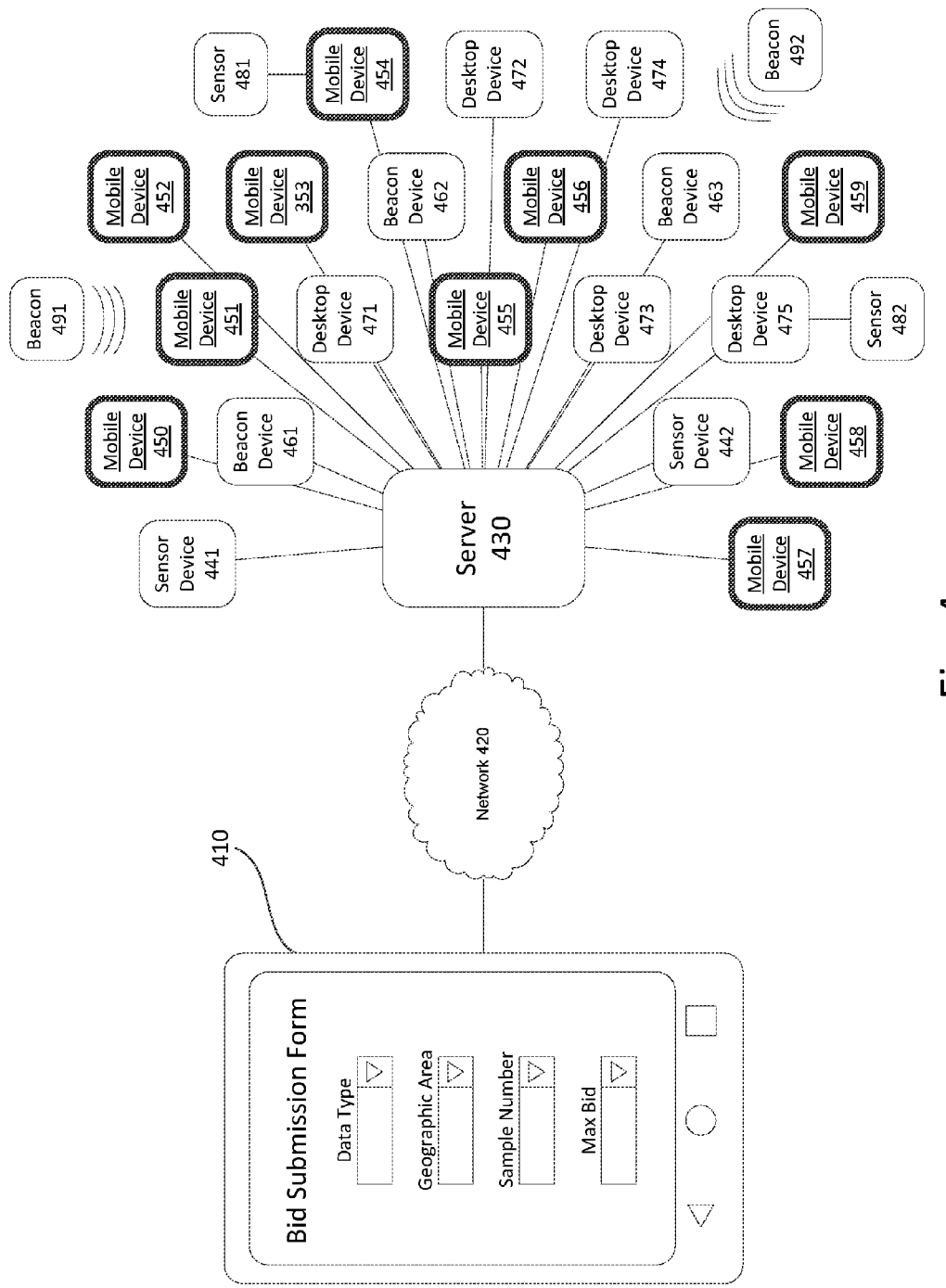
FIG. 4 illustrates an example of data collection in accordance with aspects of the disclosure.
Figure 5:
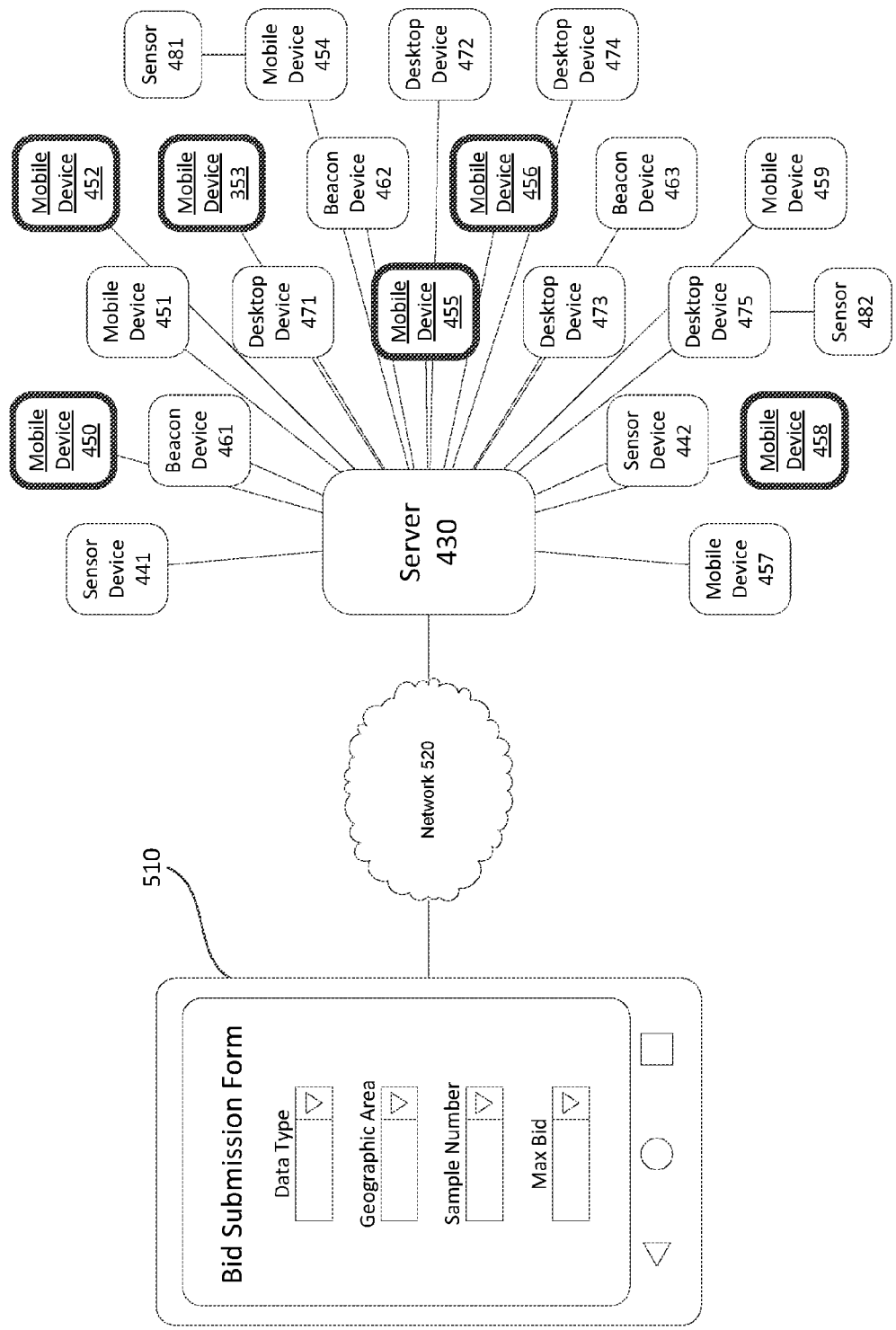
FIG. 5 illustrates another example of data collection in accordance with aspects of the disclosure.
Figure 6:
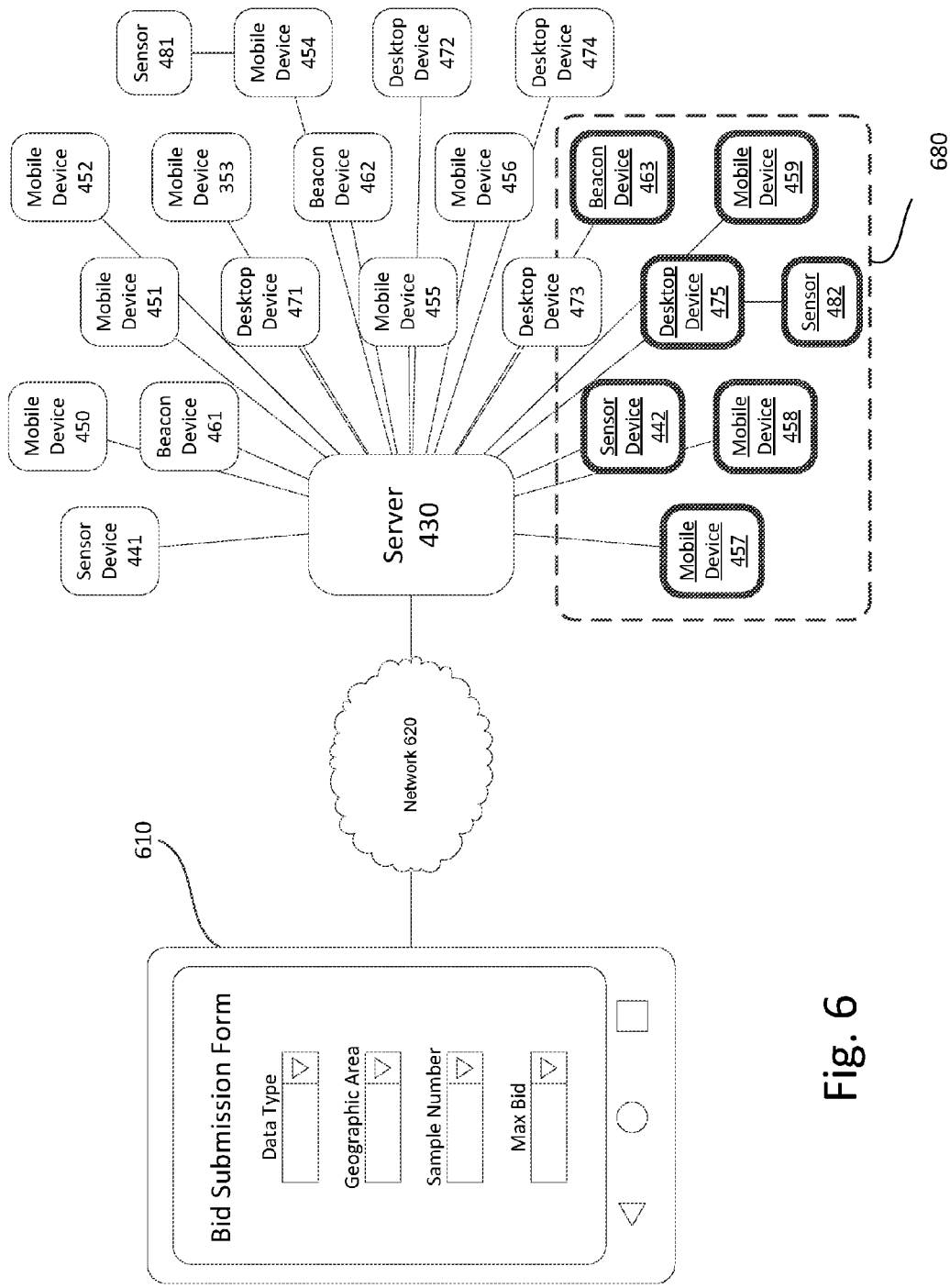
FIG. 6 illustrates another example of data collection in accordance with aspects of the disclosure.

FIGS. 4-6 provide examples of different types of data collection that may be performed by data collection devices in the sensor network. FIG. 4 provides an illustration of the resource costs associated with a particular bid request. Request submission device 410 is used to access a bid submission form such as the one depicted in FIG. 3. After the form is completed, request submission device 410 sends a bid request to server 430 through network 420. As shown in FIGS. 4-6, the sensor network comprises server 430, sensor devices 441-442, mobile devices 450-459, beacon devices 461-463, desktop devices 471-475, and sensors 481 and 482.

In this example, request submission device 410 seeks information regarding a number of mobile devices that receive a signal from one or more beacons, such as beacons 491, 492. For example, the beacons 491, 492 may be positioned at a particular location, such as a store. The data collection devices may receive a signal from the beacons 491, 492 when they come within a predefined distance of the beacons 491, 492. The data collection devices in the sensor network may thus send information to the server regarding whether or not they received the signal from one of the beacons 491, 492. In this regard, a user of the requesting device may compare this information to sales information, to compute their most productive sales windows. In another example, the beacons 491, 492 may be installed in a machine, such as a vending machine. The user of the requesting device may want to determine information such as a battery life of the vending machines. In this regard, signals sent out by the beacons may include an indication of battery life. As this data is collected by the data collection devices, it may be provided to the server 430. For reasons of privacy and security, in situations where the number of beacons is very small or specific, only the verified owner of those beacons could request such data.

If server 430 accepts the request, it may configure one or more data collection devices to collect the data. For example, the data collection devices to be used may be selected by the server based on type of device, capability, geographic location, frequency of participation in data collection, or any other criteria. In the example of FIG. 4, mobile devices 450-459 may be selected to collect the requested data. The server, having collected the data and potentially computed requested statistics, may send request submission device 410 a report summarizing the total daily percentage of mobile devices within the sensor network that interacted with beacons 491 and 492.

FIG. 5 provides an illustration of the resource costs associated with another type of bid request. In this example, request submission device 510 wants data to be collected from six hundred mobile devices within the entire sensor network regarding the temperature measured by those devices. If server 430 accepts the request, it may collect data from the requested number of devices, including mobile devices 450, 452, 453, 455, 456, and 458. If the request expresses an on-going need for this data, server 430 may collect data regarding the temperature measured by mobile devices 450, 452, 453, 455, 456, and 458 on a daily basis, or server 430 may collect this data from a different set of mobile devices each day. Regardless of whether the data is collected from the same set of devices or a different set of devices on a daily basis, only aggregated data will be sent to request submission device 510. Furthermore, in this example, some of the mobile devices may be configured to stop collecting data after a certain amount of battery power has been utilized by the data collection process.

FIG. 6 provides an illustration of the resource costs associated with another type of bid request. In this example, it will be assumed that request submission device 610 wants data to be collected from all participating devices within a particular geographic area 680, such as a particular town, a particular area having boundaries identified by latitude and longitude, etc. For example, sensor device 442, mobile devices 457-459, beacon device 463, desktop device 475, and sensor 482 may all be located within the geographic area 680. In this example, a user may be interested in the temperature conditions recorded by these devices. Accordingly, if the request is accepted by the server, these devices may be configured to report temperature conditions to the server, which is then provided to request submission device 610.

According to some aspects, each of the requests for data collection discussed in connection with FIGS. 4-6 may be submitted around a same time. Accordingly, serving all of the requests may require at least some of the data collection devices to report an amount of information which may cause a strain on a battery life of the devices. To counteract this, the server 430 may auction the resources of the data collection devices. In this regard, users requesting a great amount of data or data that causes a bigger strain on the collecting devices may be forced to pay more for such requested data. The cost may be computed as a function of the actual or estimated impact on the resources required to satisfy the request. As a result, some requests for information may be rejected if the user is unwilling to pay an increased amount for the requested data. Furthermore, the actual or estimated impact does not need to be based on 100% constant sensor network utilization. For example, an operator of a sensor network may decide to operate the sensor network at 80% utilization or at a level that maximizes the impact per data collection device of an amount of power or cycles or seconds per unit time.

Figure 7:
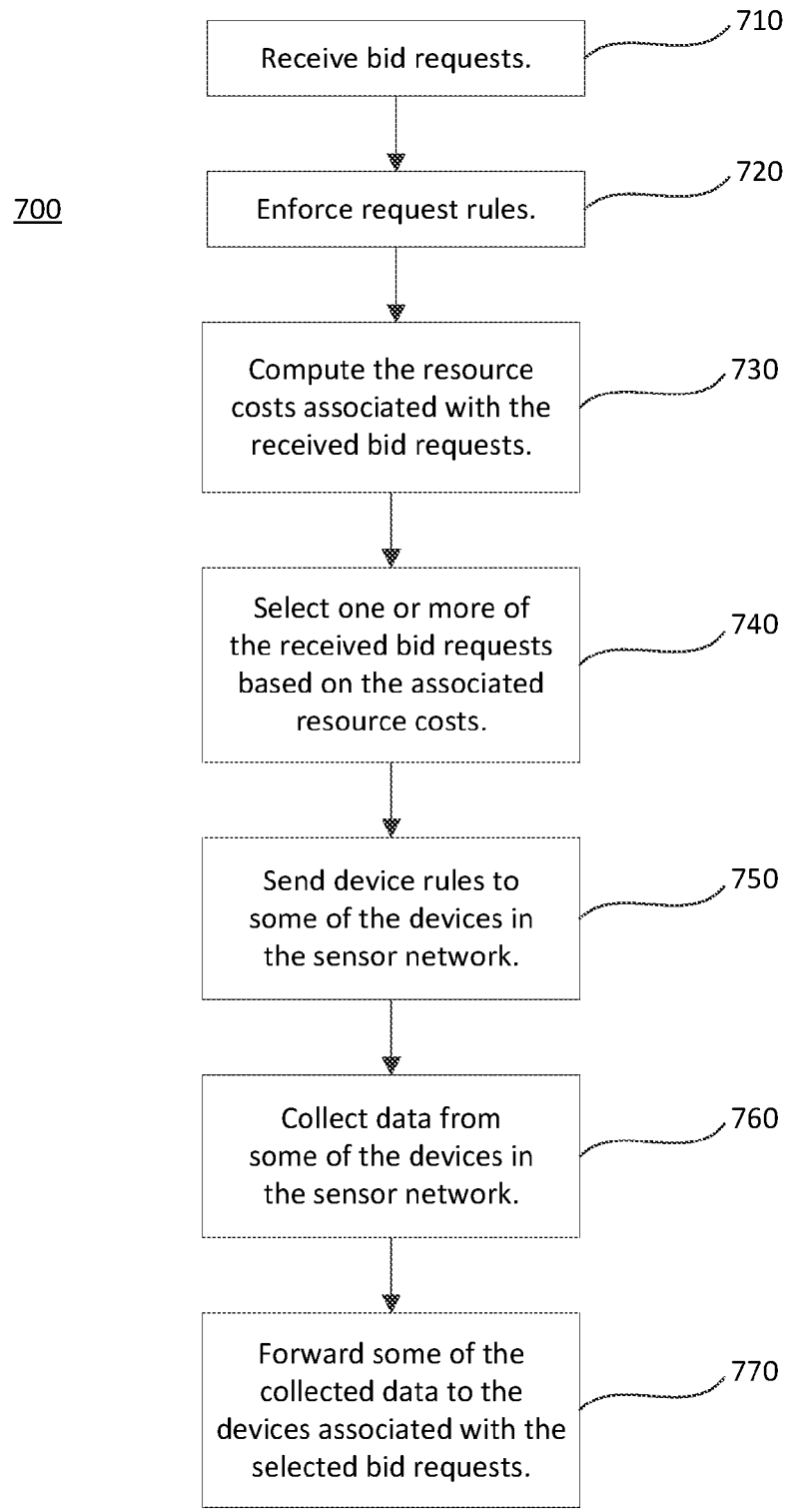
FIG. 7 is a flow diagram of an example method in accordance with aspects of the disclosure.

FIG. 7 is a flow diagram of a method in accordance with aspects of the disclosure. The method depicted in FIG. 7 can be implemented using, for example, a single centralized server or multiple servers working in coordination, and being in communication with a sensor network. The sensor network can be similar to the one illustrated in FIG. 1. However, the sensor network may contain many more devices than that depicted in FIG. 1. Furthermore, the sensor network, and intervening nodes, may comprise various configurations and protocols including the Internet, World Wide Web, intranets, virtual private networks, wide area networks, local networks, private networks using communication protocols proprietary to one or more companies, Ethernet, Wi-Fi (such as 802.11, 802.11b, g, n, or other such standards), and HTTP, and various combinations of the foregoing.

In block 710, the one or more servers receive bid requests from end users that wish to obtain information from the sensor network. These bid requests may contain a maximum price that a particular user is willing to pay for such information. These bid requests may also express an end user's a one-time need or a recurring need for a specific data type. For example, a user may want to collect a specific data type on a daily, bi-weekly, monthly, or yearly basis. The bid request may also specify the quality of the data that a user wants to collect or the number or percentage of devices in a particular geographic area that the user would like to collect from.

In block 720, the one or more servers enforce a set of request rules by automatically rejecting bid requests that raise privacy and security concerns. These request rules can be implemented such that bid requests cannot target a particular device or a very small number of devices. These request rules can also be designed to prevent users from effectively targeting a specific device or a very small number of devices by narrowing bid parameters such as data type and geographic area. The one or more servers enforce these request rules and reject any bids that fail to satisfy these rules. For example, relative and absolute thresholds may be established across all collection data types to prevent association of particular data with particular individuals or devices with certainty or statistical near-certainty. In some embodiments, this can be accomplished by setting a threshold value or minimum amount of device data that can be forwarded to a particular user. For example, a request rule can be implemented such that bids effectively requesting data from 40 or less devices will be rejected. In another example, a request rule could be implemented such that bids effectively requesting data from devices within an area smaller than ten square miles will be rejected. In some embodiments, the one or more servers may ban or exclude certain requesting devices exhibiting abusive behavior. As a result, any bids received from those devices will be automatically rejected. Under any of these circumstances, a notification may be sent to the user explaining why their bid request was rejected.

In block 730, the one or more servers convert the bid requests to resource costs. These resource costs may be related to, for example, the number of devices required to satisfy a particular request made in a bid, the battery costs of fulfilling that request, and/or the bandwidth costs of fulfilling that request. For example, a bid request for air purity may have a higher resource cost than a bid request for beacon scans because the typical subsystem used for analyzing air purity draws significantly more current from a battery than the typical wireless communication subsystem.

In block 740, the one or more servers select one or more of the bid requests. In one embodiment, a second-price auction-based model can be used. As applied in this context, users would submit bid requests for utilizing the sensor network. In one embodiment, those bid requests could contain a maximum price that a user is willing to pay for a particular data type. One or more servers could then sort and rank those bid requests based on the maximum prices contained in those requests. The user with the winning bid request would pay the greater of the second-highest maximum price submitted or a reserve price, but never more than the maximum price specified by that user. If the one or more servers determine that the sensor network cannot accommodate all of the requests, the lower ranking bids may be rejected.

In block 750, the one or more servers configure the sensor network by sending device rules to at least some of the devices within the sensor network. This process of sending device rules may also include updating device rules already stored on at least some devices within the sensor network. These device rules can be directed to the frequency in which measurements pertaining to a certain data type are made. For example, a device rule may direct a device to perform a beacon scan once per hour. These device rules can also limit the number of beacons reported per scan or limit the scan window duration. To conserve power, the device rules can direct devices to only take measurements when the owner of that device is interacting with it, as opposed to when the device is in a sleep mode or another similar mode of operation.

In blocks 760 and 770, the one or more servers collect the requested data from at least some of the devices within the sensor network and forward that data to the devices associated with the bid requests selected in block 740. Additionally, the one or more servers may use a linear combination of the maximum prices and resource costs of the selected bids along with a minimum threshold to determine the ultimate price charged to the users that sent those bid requests. This price may be sent to these users along with the relevant data in block 770.

Figure 8:
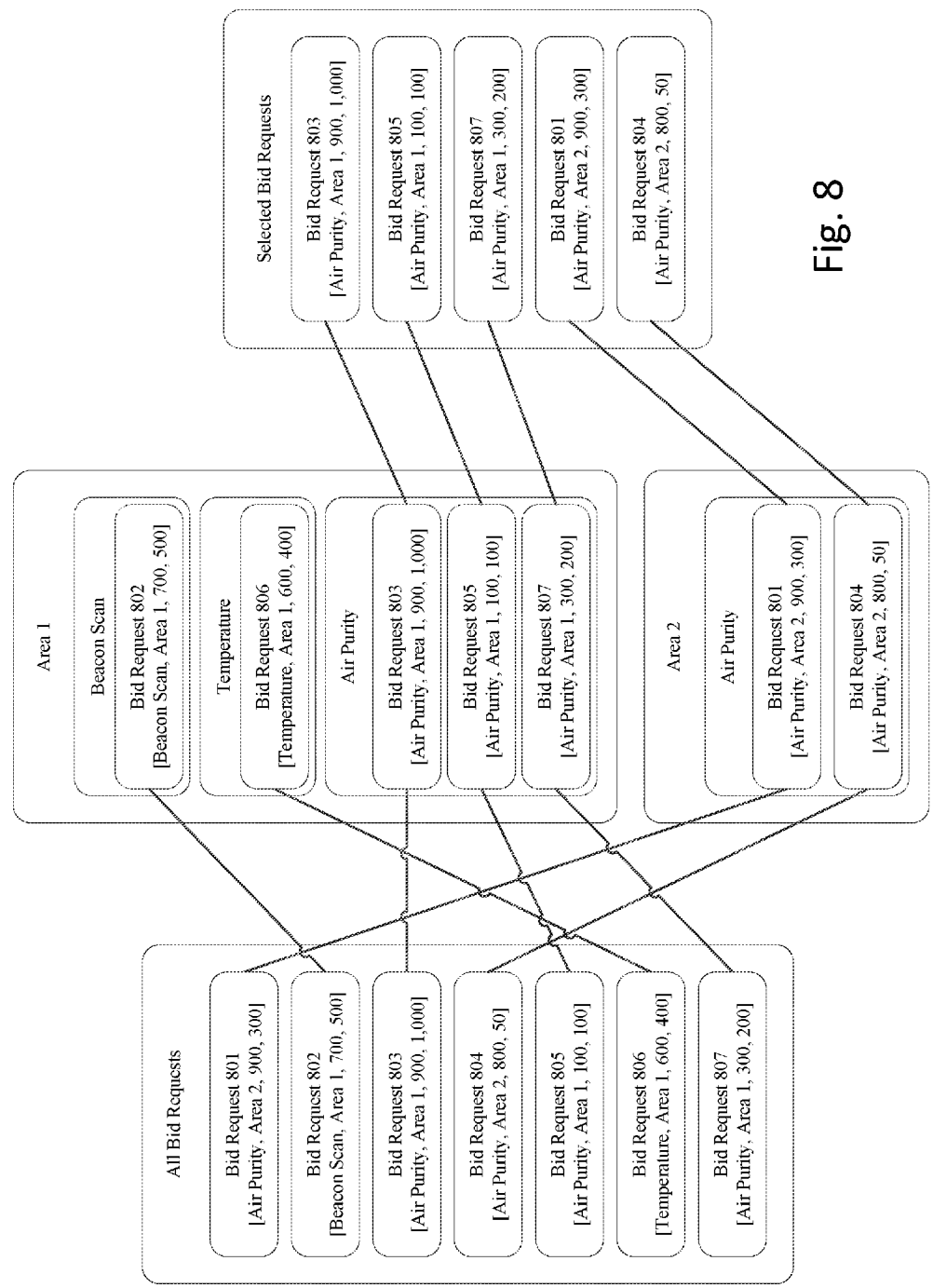
FIG. 8 illustrates an example of processing requests according to aspects of the disclosure.
Figure 9:
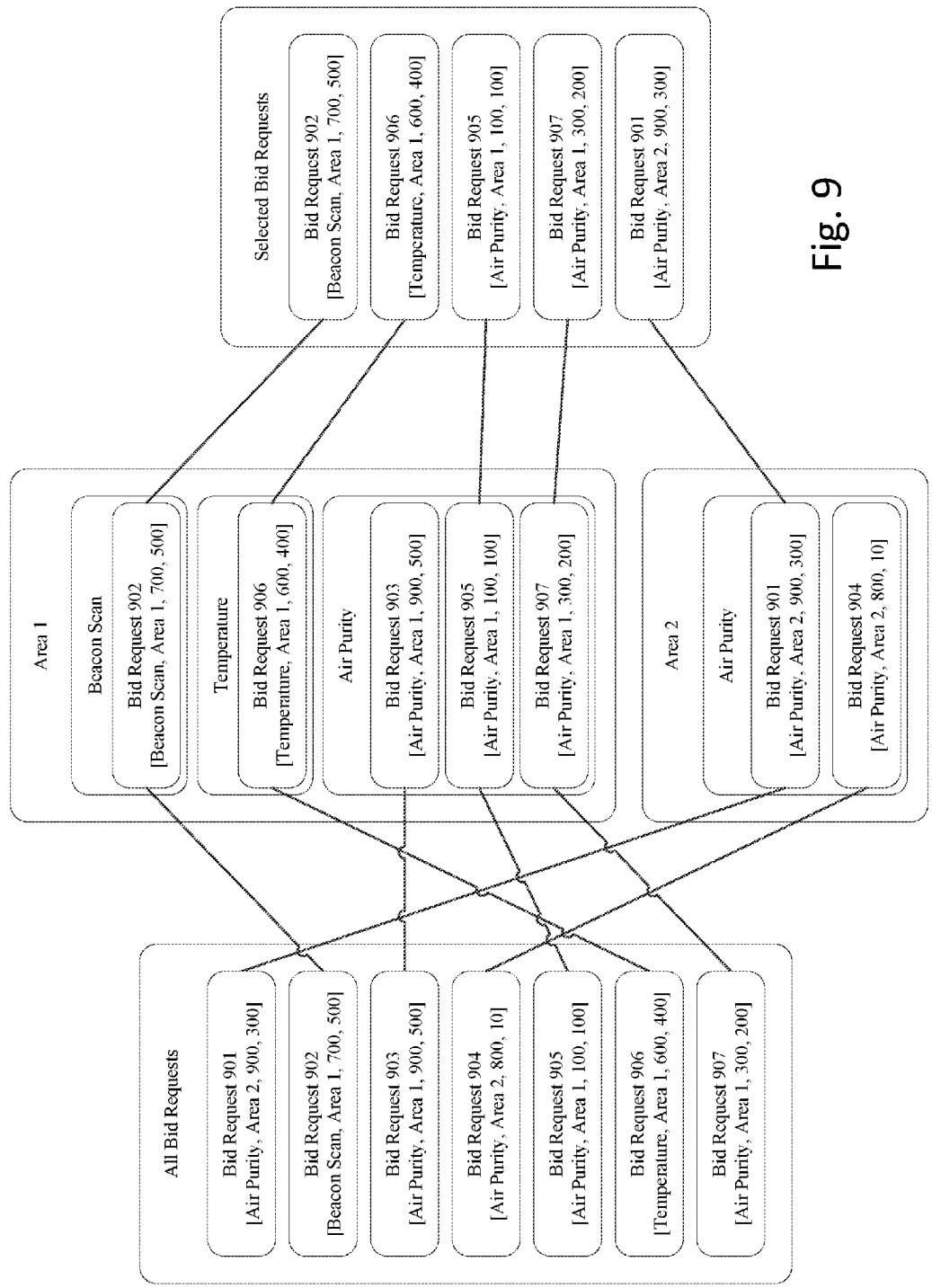
FIG. 9 illustrates another example of processing requests according to aspects of the disclosure.

FIGS. 8-9 help to illustrate blocks 730 and 740 of FIG. 7. In this example, the bid requests are prioritized based on both the maximum prices contained in those requests and the system resources required to satisfy those requests. In FIG. 8, Bid Requests 801-807 are received by the one or more servers. Each of these requests contains a field of data corresponding to the drop-down menus depicted in FIG. 3. For example, Bid Request 801 is a request for the air purity readings collected from 900 devices in Area 2 where the user that sent the bid request is willing to pay up to 300 or a particular scarce resource. For simplicity, it will be assumed throughout the rest of this example that the scarce resource is dollars. However, the scarce resource could be points, tokens, etc.

In block 730, as applied to the situation presented in FIG. 8, the one or more servers may sort all of the bids based on the selected data type and geographic area. In this simplified example, Areas 1 and 2 are separate distinct geographic locations. Therefore, the bid requests can be considered separately because the sensor network resources of those areas are likely to be distinct. However, bid requests for the same data type within the same geographic area can be considered collectively because there are overlapping resource costs. Furthermore, for the purposes of this example, it will also be assumed that data relating to air purity requires significantly more resources than data relating to beacon scans or temperature conditions. As a result, the one or more servers may determine that each device within the sensor network can either provide data relating to (1) air purity or (2) beacon scans and temperature conditions, but not both. For this example, it will also be assumed that Areas 1 and 2 both contain exactly 1,000 data collection devices.

In block 740, as applied to the situation presented in FIG. 8, the one or more servers may evaluate the sorted bids based on the constraints imposed by the resource costs of those bid requests and determine a way to optimize usage of the sensor network. With respect to Area 2, this is a simple decision because all of the bids are for data relating to air purity. Therefore, bid requests 801 and 804 can both be selected. With respect to Area 1, bid request 803 requires data to be collected from 900 out of the 1,000 devices in that area and bid requests 802 and 806 require 700 and 600 devices respectively. Since each device within the sensor network can either provide data relating to (1) distance traveled or (2) beacon scans and air purity, but not both, the sensor network cannot accommodate all of these requests. Therefore, a decision has to be made, which in this example is largely governed by the maximum prices. The bid requests for data relating to air purity total $1,300, whereas the remaining bid requests only total $900. Furthermore, bid request 803 contains a higher maximum price than bid requests 802 and 806 combined. As a result, for example, the bid requests 803, 805, and 807 may be accepted while the remaining bids are rejected.

In FIG. 9, bid requests 901-907 may be similar to bid requests 801-807. However, the maximum price for Bid Request 903 is $500, whereas the maximum price for bid request 803 is $1,000. Furthermore, the maximum price for bid request 904 is $10, whereas the maximum price for bid request 803 is $1,000. Together, these distinctions can significantly change the outcome. Here, the maximum price for bid request 903 is less than the maximum prices of bid requests 902 and 906 combined. Furthermore, due to the required number of data collection devices, the sensor network can accommodate bid requests 902, 905, 906, and 907. Specifically, 600 of the devices in Area 1 can collect data relating to both beacon scans and air quality, 100 of the devices in Area 1 can collect only data relating to beacon scans, and 300 of the devices in Area 1 can collect data relating to distance traveled. Therefore, an example result may be to select bid requests 902, 905, 906, and 907, and reject the other bids. With regard to Area 2, the reduced maximum price of bid request 904 may place that bid request below a certain predetermined threshold. For example, the one or more servers may systematically reject all bid requests with a maximum price under $20.

Figure 10:
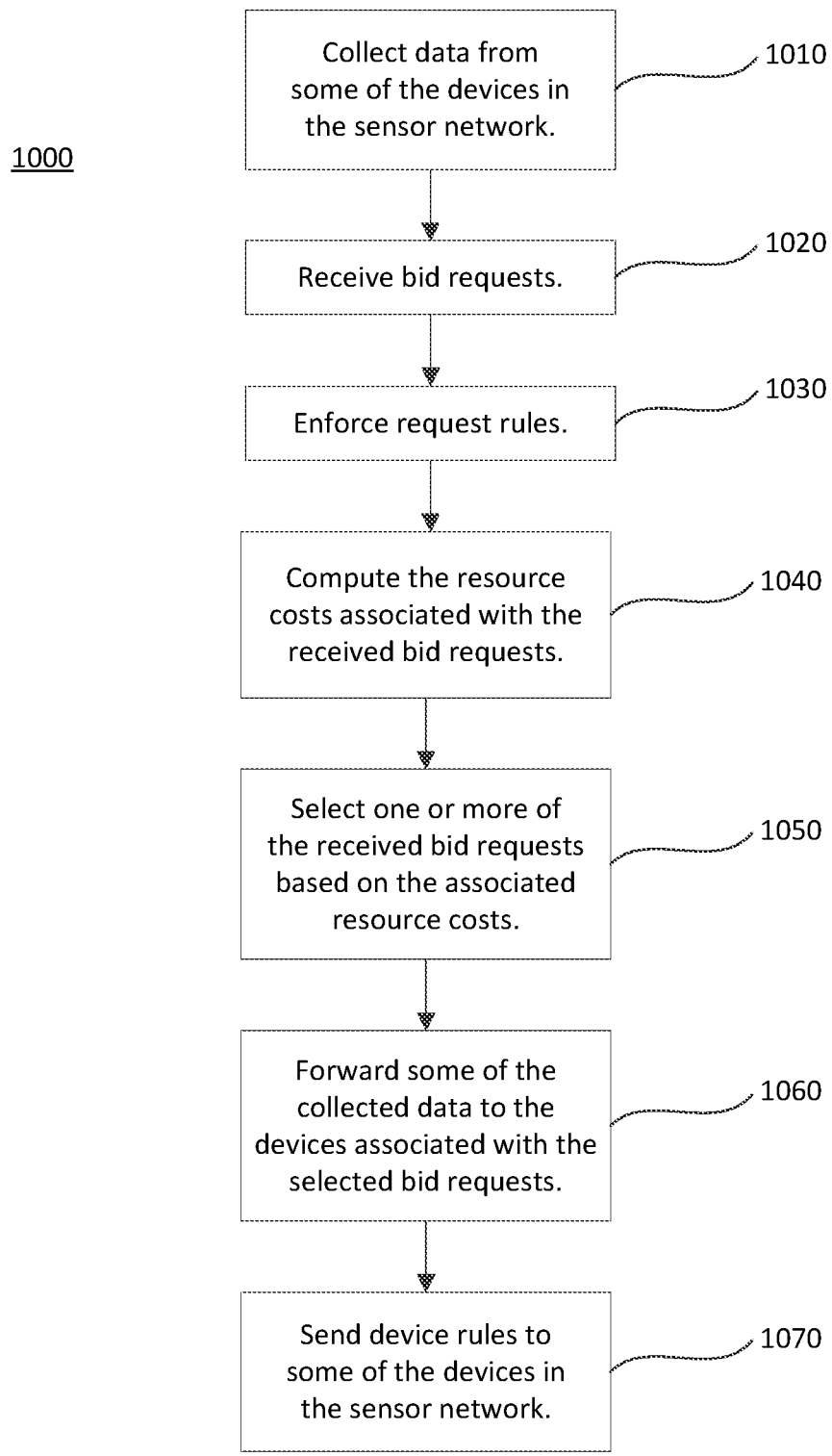
FIG. 10 is a flow diagram of another example method in accordance with aspects of the disclosure.

FIG. 10 is a flow diagram of another method where the auction is performed after the data from the sensor network is collected. In this embodiment, the auction influences how the collected data is distributed, as opposed to how it is collected. The one or more servers may still influence the collection strategies of the devices that make up the sensor network by sending device rules. In some examples, these device rules could be based on a predicted demand for data collection. For example, the one or more servers may detect a trend of increased demand for air quality measurements in rural NJ. As a result, the one or more servers may send device rules to the devices that can make such measurements to regularly record only this kind of data. By limiting the data type, the battery resources of these devices are efficiently utilized to meet the predicted demands of the users. For example, if the one or more servers detect a trend of decreased demand for air quality measurements in rural NJ, then the device rules sent to these devices may tell some of them to stop collecting this kind of data altogether.

In block 1010, the one or more servers collect data from some of the devices within the sensor network. As mentioned above, a sensor network may not be operating at full capacity. For example, an operator of a sensor network may decide to operate the sensor network at 80% utilization or at a level that maximizes the impact per data collection device of an amount of power or cycles or seconds per unit time. Furthermore, some sensors may not have the necessary hardware to meet the predicted user demands. As a result, data may not be collected from all of the devices within the sensor network.

In block 1020, the one or more servers receive bid requests from end users that wish to obtain information from the sensor network. These bid requests may contain a maximum price that a particular user is willing to pay for such information. These bid requests may also express an end user's a one-time need or a recurring need for a specific data type. For example, a user may want to collect a specific data type on a daily, bi-weekly, monthly, or yearly basis. The bid request may also specify the quality of the data that a user wants to collect or the number or percentage of devices in a particular geographic area that the user would like to collect from.

In block 1030, the one or more servers enforce a set of request rules by automatically rejecting bid requests that raise privacy and security concerns. These request rules can be implemented such that bid requests cannot target a particular device or a very small number of devices. These request rules can also be designed to prevent users from effectively targeting a specific device or a very small number of devices by narrowing bid parameters such as data type and geographic area. The one or more servers enforce these request rules and reject any bids that fail to satisfy these rules. For example, relative and absolute thresholds may be established across all collection data types to prevent association of particular data with particular individuals or devices with certainty or statistical near-certainty. In some embodiments, this can be accomplished by setting a threshold value or minimum amount of device data that can be forwarded to a particular user. For example, a request rule can be implemented such that bids effectively requesting data from 40 or less devices will be rejected. In another example, a request rule could be implemented such that bids effectively requesting data from devices within an area smaller than ten square miles will be rejected. In some embodiments, the one or more servers may ban or exclude certain requesting devices exhibiting abusive behavior. As a result, any bids received from those devices will be automatically rejected. Under any of these circumstances, a notification may be sent to the user explaining why their bid request was rejected.

In block 1040, the one or more servers convert the bid requests to resource costs. These resource costs may be related to, for example, the number of devices required to satisfy a particular request made in a bid, the battery costs of fulfilling that request, and/or the bandwidth costs of fulfilling that request. For example, a bid request for air purity may have a higher resource cost than a bid request for beacon scans because the typical subsystem used for analyzing air purity draws significantly more current from a battery than the typical wireless communication subsystem.

In block 1050, the one or more servers select one or more of the bid requests. In one embodiment, a second-price auction-based model can be used. As applied in this context, users would submit bid requests for utilizing the sensor network. In one embodiment, those bid requests could contain a maximum price that a user is willing to pay for a particular data type. One or more servers could then sort and rank those bid requests based on the maximum prices contained in those requests. The user with the winning bid request would pay the greater of the second-highest maximum price submitted or a reserve price, but never more than the maximum price specified by that user. If the one or more servers determine that the sensor network cannot accommodate all of the requests, the lower ranking bids may be rejected.

In block 1060, the one or more servers forward some of the collected data to the devices associated with the bid requests selected in block 1050. Additionally, the one or more servers may use a linear combination of the maximum prices and resource costs of the selected bids along with a minimum threshold to determine the ultimate price charged to the users that sent those bid requests. This price may be sent to these users along with the relevant data in block 1060.

In block 1070, the one or more servers configure the sensor network by sending device rules to at least some of the devices within the sensor network. This process of sending device rules may also include updating device rules already stored on at least some devices within the sensor network. These device rules can be directed to the frequency in which measurements pertaining to a certain data type are made. For example, a device rule may direct a device to perform a beacon scan once per hour. These device rules can also limit the number of beacons reported per scan or limit the scan window duration. To conserve power, the device rules can direct devices to only take measurements when the owner of that device is interacting with it, as opposed to when the device is in a sleep mode or another similar mode of operation.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method for allocating resources of a sensor network with a plurality of participating devices comprising:
   receiving, at one or more computing devices, bid requests, wherein each bid request identifies at least a type of data to be collected by a plurality of data collection devices;
   determining, with the one or more computing devices, whether any of the received bid requests violate any of a set of predefined privacy protection rules;
   rejecting, with the one or more computing devices, any bid requests determined to violate the predefined privacy protection rules;
   computing, with the one or more computing devices, resource costs associated with remaining bid requests, the resource costs corresponding to an amount of strain on the plurality of data collection devices;
   selecting, with the one or more computing devices, one or more of the remaining bid requests based on at least the computed resource costs associated with the bid requests; and
   sending, with the one or more computing devices, device rules to at least some of the plurality of data collection devices based on the one or more selected bid requests, wherein the device rules configure at least some of the plurality of data collection devices to collect information responsive to the one or more selected bid requests.

2. The method of claim 1, wherein sending, with the one or more computing devices, device rules to at least some of the plurality of data collection devices within the sensor network comprises updating device rules already stored in memory on at least some of the plurality of data collection devices.

3. The method of claim 1, wherein each bid request further identifies at least one of a subjective value of the type of data to be collected, a geographic area from which that data is to be collected, or a time frame in which that data is to be collected.

4. The method of claim 3, further comprising:
   prioritizing, with the one or more computing devices, the received bid requests based on the resource costs associated with those bid requests and at least one of the subjective value of the type of data to be collected, the geographic area from which that data is to be collected, and the time frame in which that data is to be collected.

5. The method of claim 4, wherein the subjective value is expressed as at least one of an amount of currency, tokens, points, or other type of scarce resource.

6. The method of claim 1, further comprising:
   rejecting, with the one or more computing devices, at least some of the received bid requests based on priority.

7. The method of claim 1, wherein the device rules instruct at least some of the plurality of data collection devices to only collect data when those data collection devices are in an active mode of operation.

8. The method of claim 1, wherein at least some of the device rules are based on predicted resource costs of future bid requests.

9. The method of claim 1, further comprising:
   receiving, with one or more computing devices, data collected by at least some of the plurality of data collection devices; and
   providing, with one or more computing devices, the collected data to client devices associated with the selected bid requests.

10. The method of claim 1, further comprising:
    enforcing, with on the one or more computing devices, request rules stored in memory, wherein the request rules cause the one or more computing devices to reject bid requests for data from a number of data collection devices when that number is below a predetermined threshold value.

11. A system, comprising:
    a memory; and
    one or more servers in communication with the memory and in communication with a sensor network including a plurality of participating data collection devices, the one or more servers configured to:
    receive bid requests, wherein each bid request identifies at least a type of data to be collected by the plurality of data collection devices;
    determine whether any of the received bid requests violate any of a set of predefined privacy protection rules;

reject any bid requests determined to violate the predefined privacy protection rules;
compute resource costs associated with remaining bid requests, the resource costs corresponding to an amount of strain on the plurality of data collection devices;
select one or more of the remaining bid requests based on at least the computed resource costs associated with the bid requests; and
send device rules to at least some of the plurality of data collection devices based on the one or more selected bid requests, wherein the device rules configure at least some of the plurality of data collection devices to collect information responsive to the one or more selected bid requests.

12. The system of claim 11, wherein each bid request further identifies at least one of a subjective value of the type of data to be collected, a geographic area from which that data is to be collected, or a time frame in which that data is to be collected.

13. The system of claim 11, wherein the one or more servers are further configured to:
prioritize the received bid requests based on the resource costs associated with those bid requests and at least one of a subjective value of the type of data to be collected, a geographic area from which that data is to be collected, and a time frame in which that data is to be collected.

14. The system of claim 13, wherein the subjective value is expressed as at least one of an amount of currency, tokens, points, or other type of scarce resource.

15. The system of claim 11, wherein the one or more servers are further configured to:
receive data collected by at least some of the plurality of data collection devices; and
provide the collected data to client devices associated with the selected bid requests.

16. The system of claim 11, wherein the one or more servers are further configured to:
enforce request rules stored in memory, wherein the request rules cause the one or more computing devices to reject bid requests for data from a number of data collection devices when that number is below a predetermined threshold value.

17. A non-transitory computer-readable medium storing instructions executable by a processor for allocating resources of a sensor network with a plurality of participating devices, the method comprising:
receiving, at one or more computing devices, bid requests, wherein each bid request identifies at least a type of data to be collected by a plurality of data collection devices;
determining, with the one or more computing devices, whether any of the received bid requests violate any of a set of predefined privacy protection rules;
rejecting, with the one or more computing devices, any bid requests determined to violate the predefined privacy protection rules;
computing, with the one or more computing devices, resource costs associated with remaining bid requests, the resource costs corresponding to an amount of strain on the plurality of data collection devices;
selecting, with the one or more computing devices, one or more of the remaining bid requests based on at least the computed resource costs associated with the bid requests; and
sending, with the one or more computing devices, device rules to at least some of the plurality of data collection devices based on the one or more selected bid requests, wherein the device rules configure at least some of the plurality of data collection devices to collect information responsive to the one or more selected bid requests.

18. The non-transitory computer-readable medium of claim 17, wherein the method further comprises:
prioritizing, with the one or more computing devices, the received bid requests based on the resource costs associated with those bid requests.

19. The non-transitory computer-readable medium of claim 17, wherein the method further comprises:
receiving, with one or more computing devices, data collected by at least some of the plurality of data collection devices; and
providing, with one or more computing devices, the collected data to client devices associated with the selected bid requests.

20. The non-transitory computer-readable medium of claim 17, wherein the method further comprises:
enforcing, with on the one or more computing devices, request rules stored in memory, wherein the request rules cause the one or more computing devices to reject bid requests for data from a number of data collection devices when that number is below a predetermined threshold value.

* * * * *